(12) United States Patent  
Nakamura et al.

(10) Patent No.: US 8,403,550 B2  
(45) Date of Patent: Mar. 26, 2013

(54) SURFACE LIGHT SOURCE DEVICE (75) Inventors: Junji Nakamura, Tokyo (JP); Yoji Oki, Tokyo (JP); Fumitoshi Isobe, Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 112 days.

(21) Appl. No.: 13/043,452

(22) Filed: Mar. 8, 2011

(65) Prior Publication Data

US 2011/0228557 A1 Sep. 22, 2011

(30) Foreign Application Priority Data

Mar. 8, 2010 (JP) .................................. 2010-050091

(51) Int. Cl.
*F21V 7/04* (2006.01)
(52) U.S. Cl. ........ 362/607; 362/617; 362/618; 362/613; 362/626
(58) Field of Classification Search .................. 362/97.1, 362/97.3, 600, 603, 609, 615, 616, 617, 620
See application file for complete search history.

(56) References Cited

U.S. PATENT DOCUMENTS 6,885,360 B2 * 4/2005 Hara et al. .................... 345/102

FOREIGN PATENT DOCUMENTS

JP 7-159622 A 6/1995

* cited by examiner

*Primary Examiner* — Ali Alavi
(74) *Attorney, Agent, or Firm* — Kenealy Vaidya LLP (57) ABSTRACT

A surface light source device can be configured to increase front luminance as compared to certain conventional light sources. The surface light source device can include a light guiding plate having a first end surface and a second end surface, a light exiting surface formed to have a light exiting portion and a tapered surface disposed opposite to the light exiting surface. A light source can be disposed along the first end surface of the light guiding plate, and a reflection sheet can be disposed on the tapered surface of the light guiding plate. A prism sheet having a prism surface can face toward the light exiting portion of the light guiding plate. The light exiting portion can be disposed a predetermined entrance length away from the first end surface along the light exiting surface so that the light exiting surface can form a predetermined taper angle with the tapered surface.

16 Claims, 8 Drawing Sheets

SURFACE LIGHT SOURCE DEVICE

This application claims the priority benefit under 35 U.S.C. §119 of Japanese Patent Application No. 2010-050091 filed on Mar. 8, 2010, which is hereby incorporated in its entirety by reference.

TECHNICAL FIELD

The presently disclosed subject matter relates to a surface light source device.

BACKGROUND ART

Known surface light sources for use in a back light system for a liquid crystal display device or the like may include those of side edge type, for example, as disclosed in Japanese Patent Application Laid-Open No. Hei 7-159622.

Figure 1A:
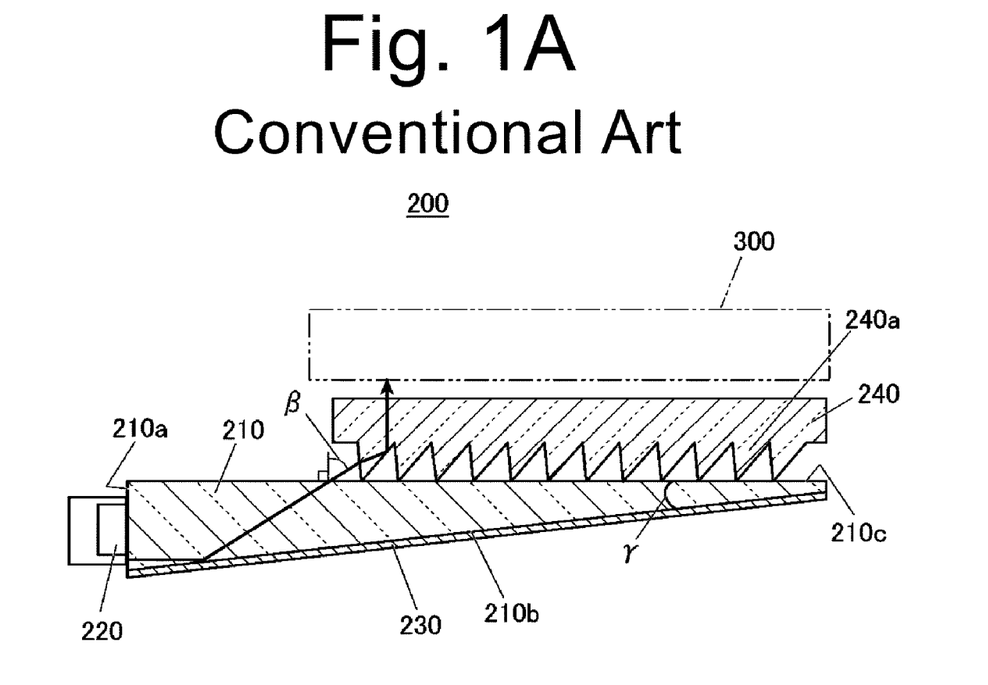
FIG. 1 is a cross sectional view schematically illustrating a conventional surface light source device.

FIG. 1A is a schematic cross sectional view illustrating a surface light source device 200 of such a side edge type.

As shown, the surface light source device 200 can include: a light guiding plate 210 having a wedge-shaped cross section, and a light incident surface 210a with a large width, a tapered surface 210b, and a light exiting surface 210c; a light source 220 disposed along the light incident surface 210a; a reflection sheet 230 disposed on the tapered surface 210b; and a prism sheet 240 having a prism portion 240a, the prism sheet 240 facing downward and disposed over the light exiting surface 210c. In this surface light source device 200, the light beams emitted from the light source 220 can be incident on the light guiding plate 210 through the light incident surface 210a. The light beams in the light guiding plate 210 can be uniformly distributed while reflected by the reflection sheet 230 on the tapered surface 210b, and then exit from the light exiting surface 210c. The exiting light beams from the light guiding plate 210 can be condensed by the prism portion 240a of the prism sheet 240 to be projected toward a liquid crystal display part (liquid crystal display) 300.

The light beams exiting the prism sheet 240 may be directed in various directions including the direction perpendicular to the surface of the liquid crystal display part 300. Namely, the effective light beams with which the liquid crystal display part 300 is illuminated are those incident perpendicularly on the liquid crystal display part 300 meaning that only the light beams perpendicularly exiting from the light exiting surface of the prism sheet 240 are effective for illuminating the liquid crystal display part 300. Accordingly, it is required or at least helpful that the light exiting angle β at which the light beams exit from the light exiting surface 210c of the light guiding plate 210 be limited within a predetermined range so that the exiting light beams from the prism sheet 240 can be directed substantially perpendicularly to the light exiting surface of the prism sheet 240 by the prism portion 240a of the prism sheet 240. Furthermore, the taper angle γ formed between the tapered surface 210b and the light exiting surface 210c of the light guiding plate 210 should be adjusted to be a predetermined angle so that the light beams that pass through the light guiding plate 210 can be reflected to the light exiting surface 210 and exit therethrough by the light exiting angle β, the light exiting angle β being within the above predetermined range.

Recently, surface light source devices with higher front luminance have been demanded because of the development of higher definition liquid crystal displays or the application to head-up displays.

The above-mentioned conventional surface light source device 200 however has had problems when utilizing a high-power light source 220 for achieving higher front luminance. Since such a high-power light source 220 is thicker than before, the taper angle γ of the light guiding plate 210 must be made thicker, thereby increasing the light beams exiting by light exiting angles β out of the above predetermined range. This can hinder in increasing the higher front luminance.

Furthermore, conventional light source devices 200 typically utilize a side-view type light emitting diode (LED) as a light source 220. However, many high-power light sources may be top-view type LEDs having light distribution characteristics that are nearer the complete diffusion than the side view-type LEDs. Accordingly, if the top-view type LED is utilized in order to increase the output of the light source 220, the light beams propagating through the light guiding plate 210 may be likely to rise at an acute angle due to the near-complete diffusion light distribution characteristics. This means the light exiting angle β may become smaller, resulting in an increase in the percentage of the light beams exiting at a light exiting angle β out of the predetermined range. Accordingly, it is difficult to increase the front luminance of such a surface light source device.

SUMMARY

The presently disclosed subject matter was devised in view of these and other problems and features and in association with the conventional art. According to an aspect of the presently disclosed subject matter, an embodiment of a surface light source device can be configured to increase the front luminance more than conventional devices.

According to another aspect of the presently disclosed subject matter, a surface light source device can include: a light guiding plate having a first end surface and a second end surface being narrower than the first end surface, a light exiting surface formed to have a light exiting portion and a tapered surface disposed opposite to the light exiting surface and tapered with respect to the light exiting surface from the first end surface to the second end surface of the light guiding plate; a light source disposed along the first end surface of the light guiding plate; a reflection sheet disposed on the tapered surface of the light guiding plate; and a prism sheet having a prism surface facing toward the light exiting portion of the light guiding plate. In this surface light source device, the light exiting portion can be disposed a predetermined entrance length away from the first end surface along a direction perpendicular to the first end surface so that the light exiting surface within a plane perpendicular to the first end surface can form a predetermined angle with the tapered surface as a taper angle.

According to still another aspect of the presently disclosed subject matter, in the surface light source device with the above configuration, the taper angle γ should satisfy the following equations (1) and (2), and the entrance length L should satisfy the following equation (2):

$$\sin(90 - 2m\gamma) = n_A/n_G \times \sin\beta \tag{1}$$

$$L = (a-b)/\tan\gamma - L_R \tag{2}$$

Wherein m: the number of reflection the light beams that is incident on the first end surface and is almost perpendicular to the first end surface can be reflected by the tapered surface, $n_A$: refraction index of air, $n_G$: refraction index of the light guiding plate, β: the light exiting angle by which the light beams exit from the light exiting portion to the prism sheet facing downward (unit: degrees), a: the thickness of the light guiding plate at the first end surface side, b: the thickness of the light guiding plate at the second end surface side, and $L_R$: the length of the light exiting portion along the direction perpendicular to the first end surface.

According to still another aspect of the presently disclosed subject matter, the surface light source device with the above configuration can further include a condenser lens disposed between the light source and the first end surface of the light guiding plate, the condenser lens being capable of condensing the light beams emitted from the light source within a range equivalent to a thickness of the light guiding plate in a vertical direction.

According to still further another aspect of the presently disclosed subject matter, in the surface light source device with the above configuration, the condenser lens can be a cylindrical lens.

According to the presently disclosed subject matter, the light exiting portion that is formed over the light exiting surface can be disposed a predetermined entrance length away from the first end surface along a direction perpendicular to the first end surface so that the light exiting surface can form a predetermined angle with the tapered surface as a taper angle. By providing such an entrance length, even if a thicker high-power light source is utilized, the taper angle can be set to a predetermined angle, and accordingly, the light exiting angle from the light exiting surface can be allowed to fall within the predetermined range so that the light beams can be condensed by the prism sheet in a substantially perpendicular direction. This can improve the front luminance when compared with the case of a conventional device.

Furthermore, according to the presently disclosed subject matter, a condenser lens can be provided between the light source and the first end surface of the light guiding plate so as to condense the light beams from the light source within a range equivalent to the thickness of the light guiding plate in a vertical direction. Accordingly, even if a top-view type LED is utilized for the light source, the light beams diffused in the thickness direction of the light guiding plate can be condensed in the thickness direction in order to be incident on the light guiding plate properly. Therefore, the light beams propagating through the light guiding plate can be prevented from being risen at an acute angle in the thickness direction, and accordingly, the light exiting angle from the light exiting portion R can be allowed to fall within the predetermined range. This can improve the front luminance.

BRIEF DESCRIPTION OF DRAWINGS

These and other characteristics, features, and advantages of the presently disclosed subject matter will become clear from the following description with reference to the accompanying drawings, wherein.

DESCRIPTION OF EXEMPLARY EMBODIMENTS

A description will now be made below to surface light source devices of the presently disclosed subject matter with reference to the accompanying drawings in accordance with exemplary embodiments.

Figure 2:
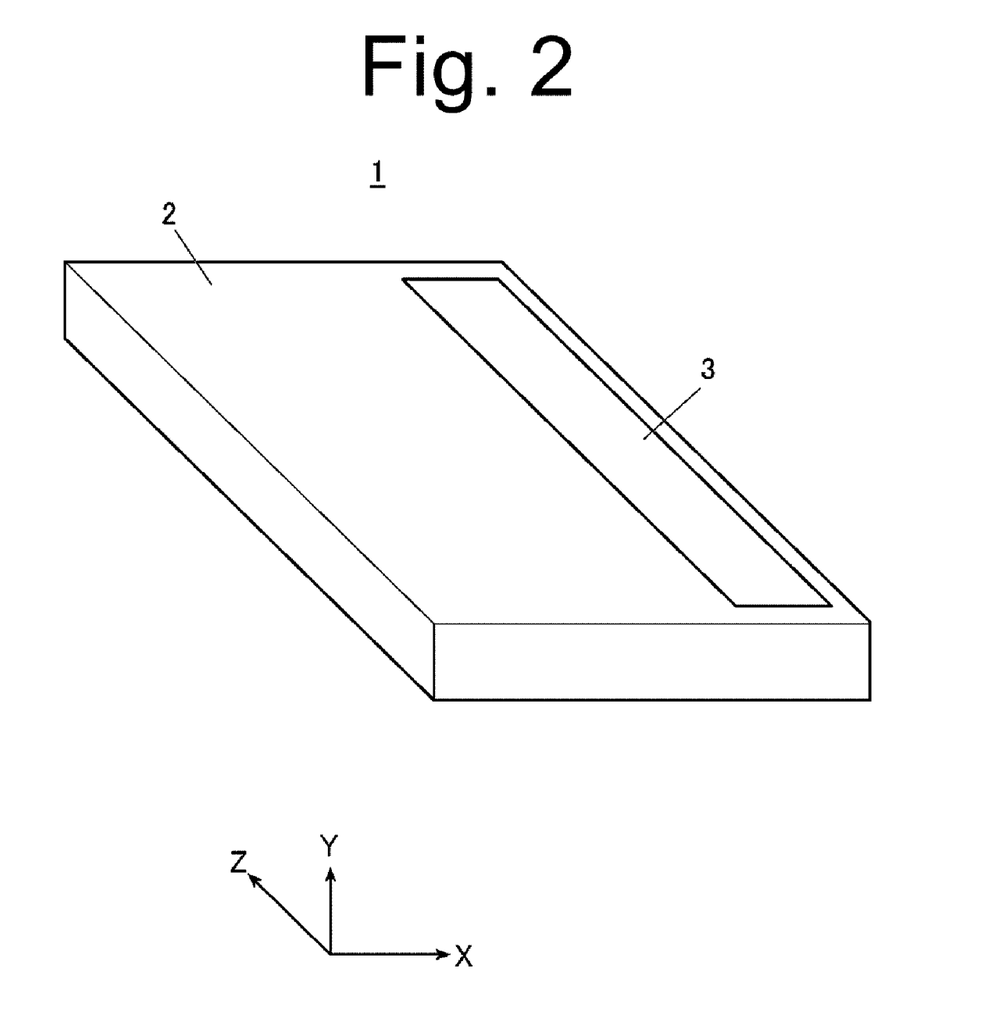
FIG. 2 is a perspective view illustrating a surface light source device made in accordance with principles of the presently disclosed subject matter.
Figure 3:
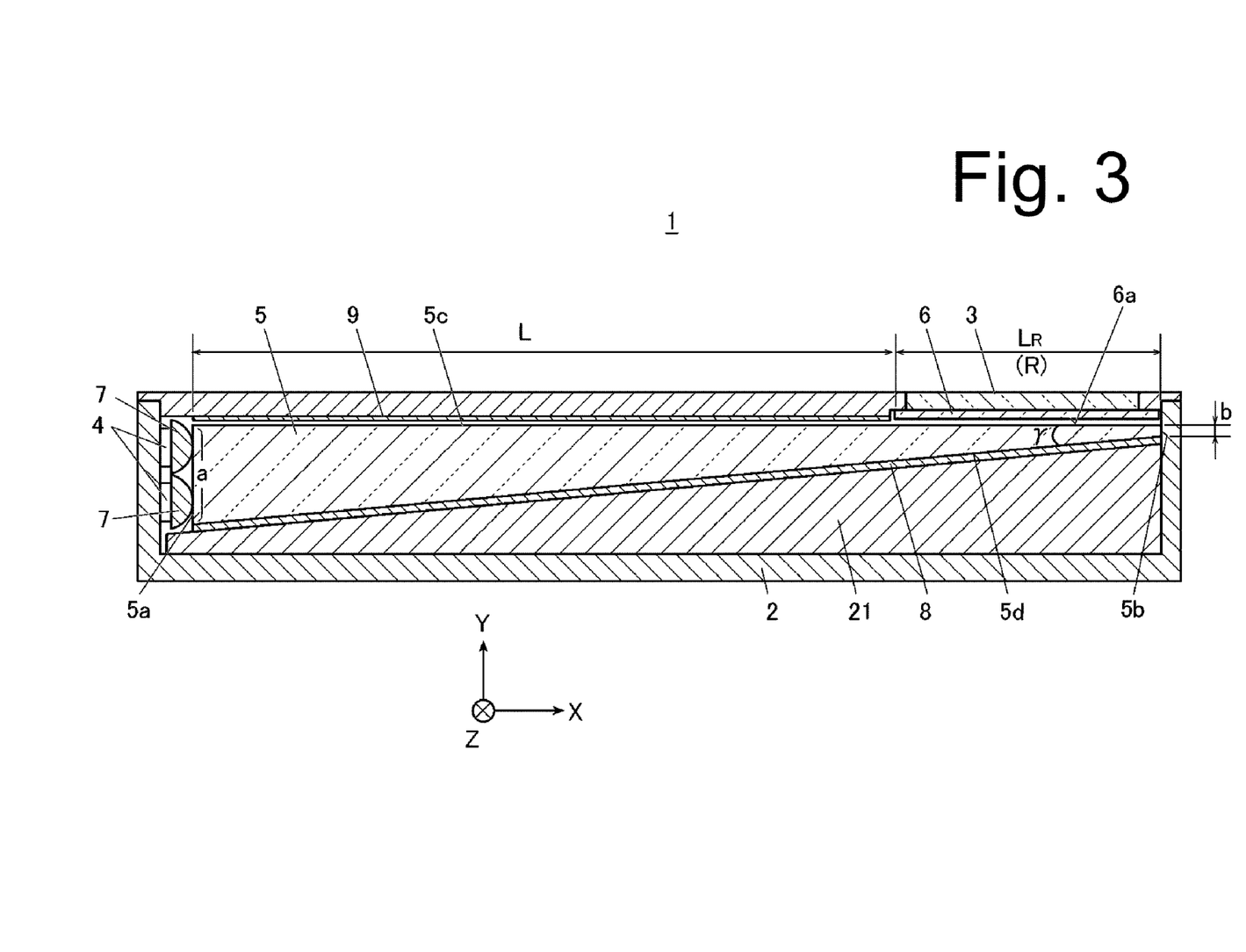
FIG. 3 is a cross-sectional view illustrating the surface light source device of FIG. 2.

FIG. 2 is a perspective view illustrating a surface light source device 1 made in accordance with principles of the presently disclosed subject matter, and FIG. 3 is a cross-sectional view illustrating the surface light source device 1 of FIG. 2.

As shown in these drawings, the surface light source device 1 can be configured to be a plate shape and can be covered with a housing 2 except for the area where a transparent member 3 extending in a width direction (Z direction in the drawing) is provided, so that the transparent member 3 can be exposed there. The surface light source device 1 can include, inside the housing 2, a plurality of light sources 4, a light guiding plate 5 having a wedge-shaped cross section, a prism sheet 6 provided corresponding to the transparent member 3.

The surface light source device 1 can be configured so that the light beams emitted from the light sources 4 can be incident on the light guiding plate 5 and propagate through the same, and then exit toward the prism sheet 6, where the light beams can be condensed to be projected through the transparent member 3.

The light guiding plate 5 can have a first end surface 5a and a second end surface 5b opposite to the first end surface 5a in a direction of the wedge shape and being narrower than the first end surface 5a. The light sources 4 can be LEDs arranged along the wide first end surface 5a of the light guiding plate 5. Specifically, the light sources 4 can be composed of a plurality of LEDs arranged in two rows adjacent to each other in the thickness direction of the light guiding plate 5 (Y direction in the drawing) with each row including a plurality of LEDs along the Z direction. The light sources 4 can be disposed so that their light emitting surfaces face towards the first end surface 5a of the light guiding plate 5 while their optical axes are aligned with the length direction of the light guiding plate 5 (X direction in the drawing).

Figure 4A:
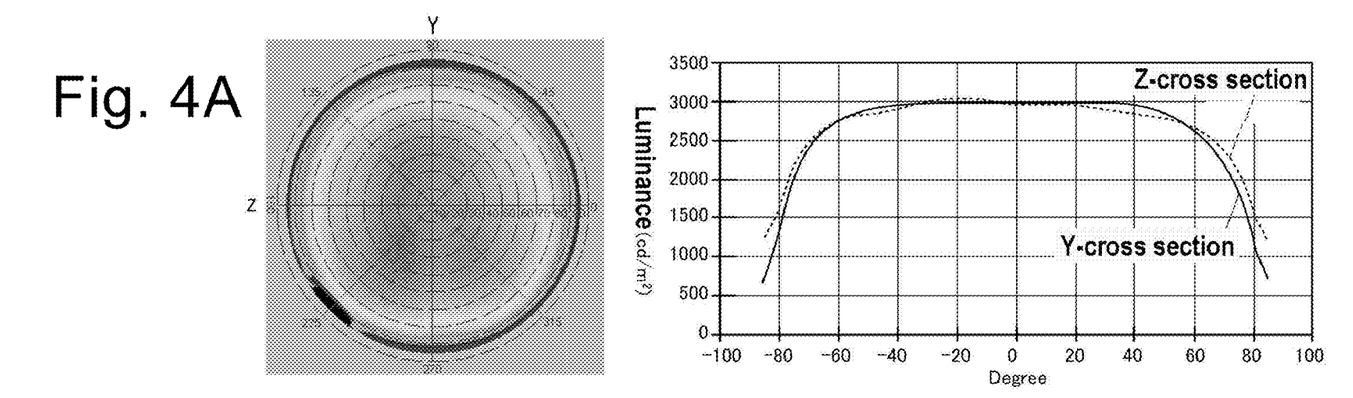
FIGS. 4A and 4B are diagrams illustrating the condensing characteristics of condenser lenses.
Figure 4B:
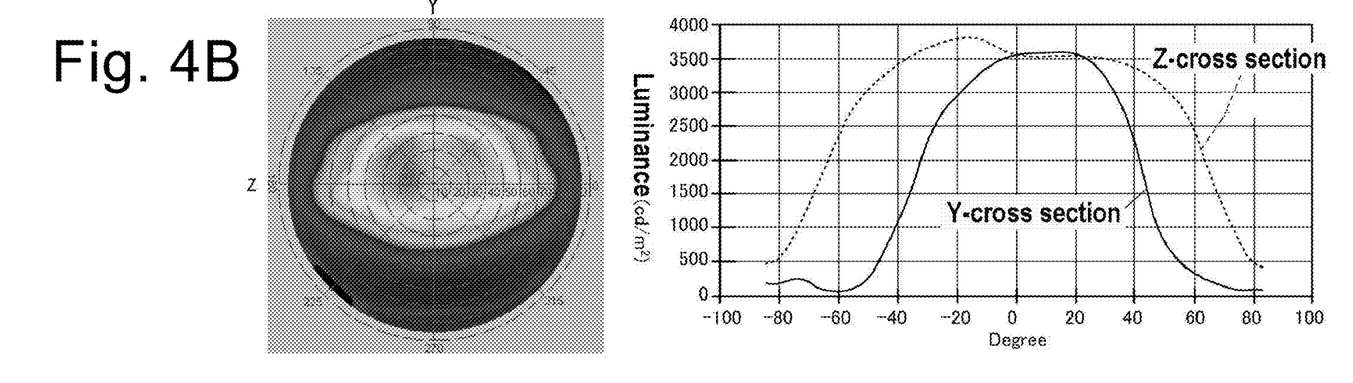

Condenser lenses 7 can be disposed between the light sources 4 and the light guiding plate 5. The condenser lenses 7 can condense the light beams emitted from the light sources 4 within a certain range in the Y direction. The condenser lenses 7 can be cylindrical lenses disposed along the Z direction with their cylindrical surfaces facing towards the light guiding plate 5. In the present exemplary embodiment, the condenser lens 7 can have condensing characteristics as shown in FIGS. 4A and 4B. Herein, FIG. 4A includes a luminance distribution diagram of a single light source 4 from its front, and luminance distribution diagrams (cross section) of the same in the Y direction and Z direction, respectively. FIG. 4B includes a luminance distribution diagram of a single light source 4 via a condenser lens 7 from its front, and luminance distribution diagrams (cross section) of the same in the Y direction and Z direction, respectively. As clearly shown in these diagrams, the condenser lens 7 can condense the light beams emitted from the light source 4, in particular, in the Y direction.

As shown in FIG. 3, the prism sheet 6 can have a prism surface 6a including a plurality of prisms 61. The prism sheet 6 can be a so-called facing-downward prism sheet with the prism surface 6a facing towards the light exiting portion R of the light guiding plate 5, to be described later. The prism sheet 6 can be disposed such that one end thereof in the X direction is matched to the position of the second end surface 5b of the light guiding plate 5. In this manner, the prism sheet 6 can partially cover the light exiting surface 5c of the light guiding plate 5 near the second end surface 5b.

The light guiding plate 5 can be an acrylic resin-made member with its cross section being a right-angled triangle elongated in the X direction. The light guiding plate 5 can include the light exiting surface 5c perpendicular to the first and second end surfaces 5a and 5b, and a tapered surface 5d disposed opposite to the light exiting surface 5c and tapered with respect to the light exiting surface 5c from the first end surface 5a to the second end surface 5b. A reflection sheet 8 can be disposed over the tapered surface 5d so that the light guiding plate 5 can be supported by a supporting member 21 via the reflection sheet 8.

A portion of the light exiting surface 5c of the light guiding plate 5 can face towards the prism sheet 6 to serve as the light exiting portion R for allowing light beams to exit toward the prism sheet 6. Accordingly, light beams can be projected via the transparent member 3 to the outside. Herein, the light exiting portion R can be disposed a predetermined entrance length L away from the first end surface 5a in the X direction. The entrance length L can be set so that the light exiting surface 5c within a plane perpendicular to the first end surface 5a (in an X-Y plane) can form a predetermined angle with the tapered surface 5d as a taper angle γ. Then, a reflection sheet 9 can be attached to an inner surface of the housing 2 corresponding to the area of the entrance length L. Namely, the reflection sheet 9 can cover the light exiting surface 5c side where the prism sheet 6 does not face in order for the light beams reaching the light exiting surface 5c side to be reflected within the light guiding plate 5.

The tapered surface 5d of the light guiding plate 5 can form a taper angle γ with the light exiting surface 5c within the X-Y plane. Specifically, the taper angle γ should satisfy the following equation (1):

$$\sin(90 - 2m\gamma) = n_A/n_G \times \sin\beta \qquad (1),$$

wherein m: the number of reflection the light beams that is incident on the first end surface 5a along the X direction can be reflected by the tapered surface 5d, $n_A$: refraction index of air, $n_G$: refraction index of the light guiding plate 5, β: the light exiting angle by which the light beams exit from the light exiting portion R to the prism sheet 6 (unit: degrees), A description will now be given of how the taper angle γ can be computed in accordance with the equation (1) with reference to FIGS. 5 and 6.

Figure 5:
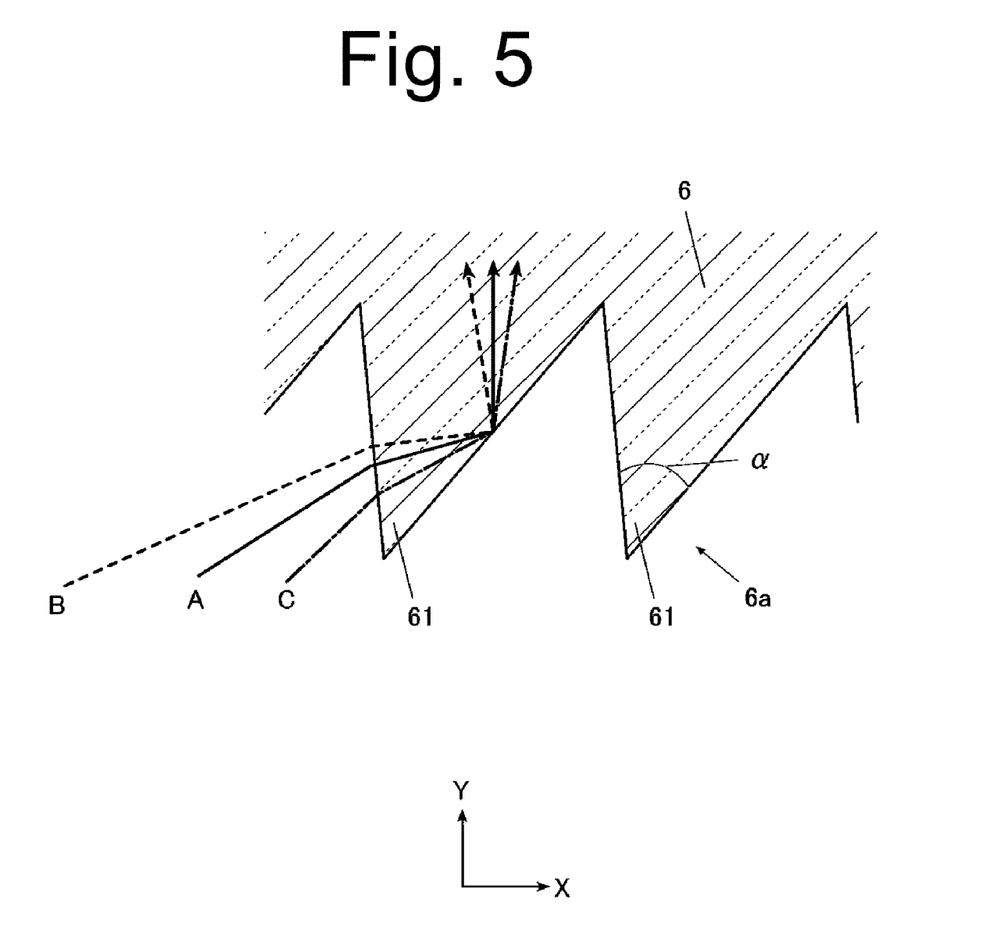
FIG. 5 is a cross-sectional view illustrating an optical path travelling through a prism sheet.

First, with reference to FIG. 5, the light beams exiting from the prism sheet 6 can be utilized to illuminate a liquid crystal display portion (not shown) disposed above the transparent member 3. In order to effectively illuminate the display portion, the light beams can be configured to travel along line A (optical path) in the Y direction. In view of this, the angle at which the light beams can be incident on the prism sheet 6 through the optical path A, or the light exiting angle β exiting from the light exiting portion R can be computed according to Snell's law while using $n_A$ of the refraction index of air, $n_G$ of the refraction index of the light guiding plate 5, and an apex angle α of the prism 61.

Figure 6A:
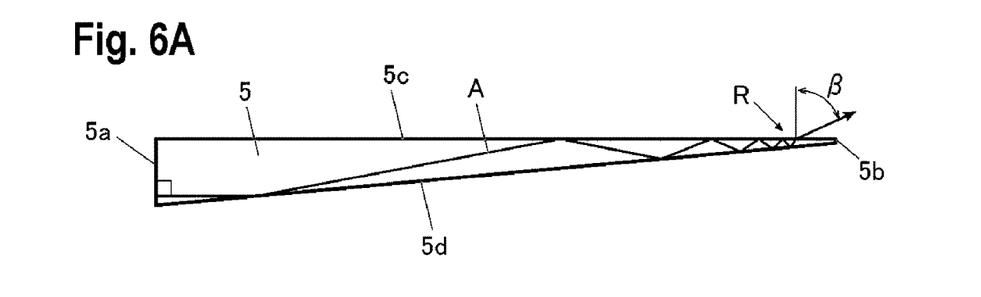
FIGS. 6A, 6B, and 6C are schematic cross-sectional views of a light guiding plate illustrating optical paths through which light beams can propagate within the light guiding plate.
Figure 6B:
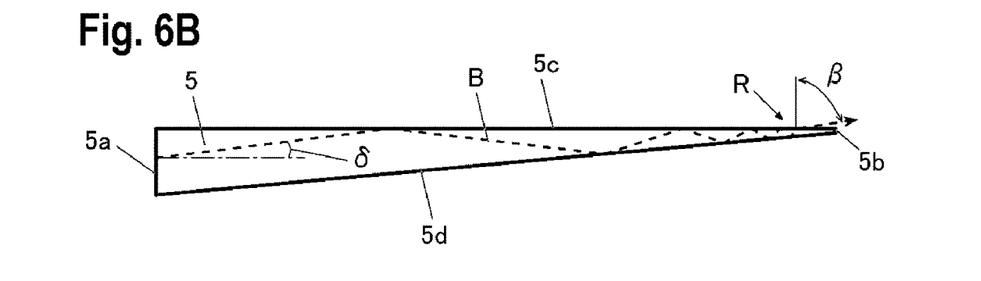
Figure 6C:
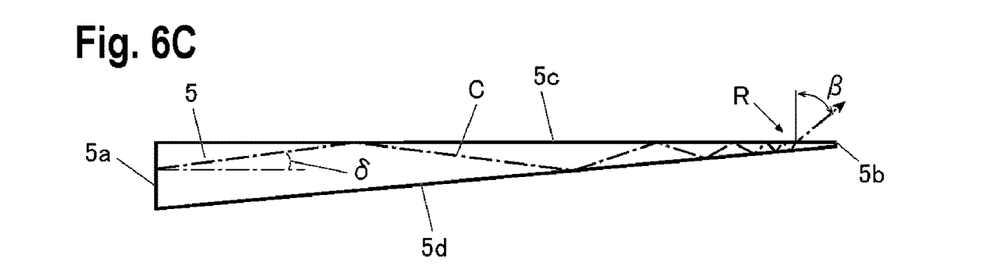
Figure 7A:
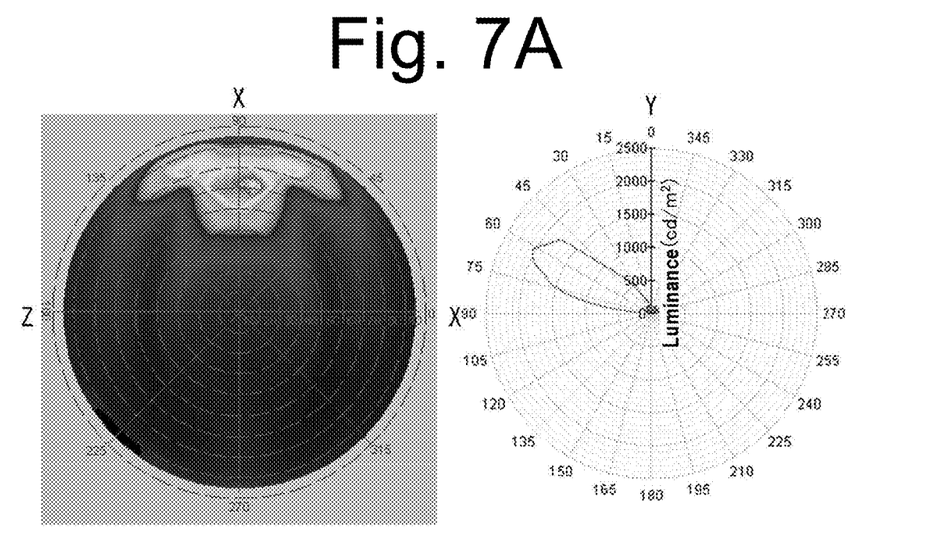
FIGS. 7A and 7B are diagrams illustrating the condensing characteristics of prism sheets.
Figure 7B:
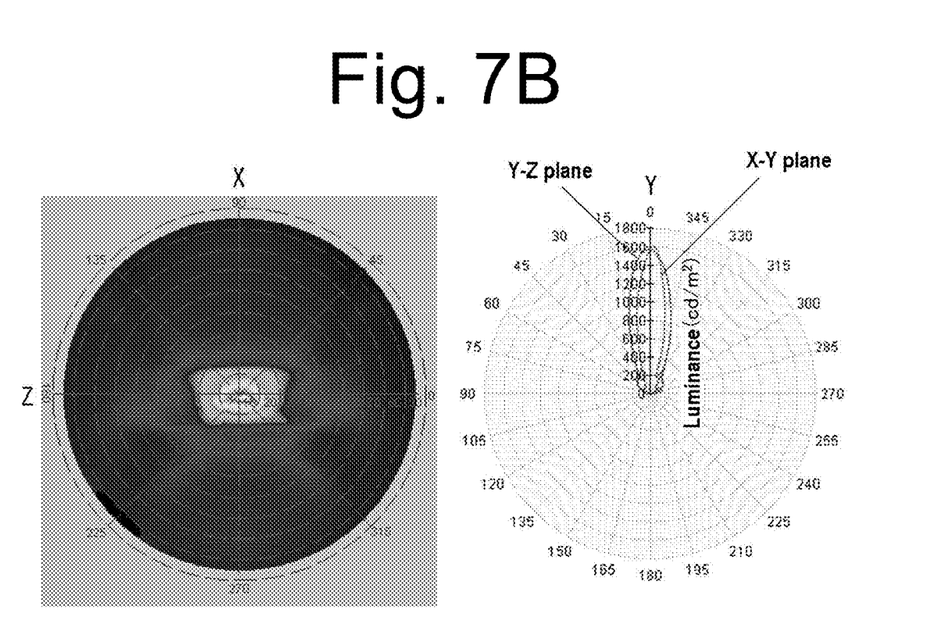

Then, a combination of the number of reflections m (five in the illustrated example) by which the light beams are reflected by the tapered surface 5d (or reflection sheet 8), and a taper angle γ can be computed according to the above equation (1) so that the light beams from the light source 4 can be incident on the light guiding plate 5 while the light beams can travel along the optical path A that can be drawn from the prism side to obtain the best light exiting angle β as shown in FIG. 6A. Accordingly, the taper angle γ can be computed.

Using the computed taper angle γ, the entrance length L can be computed on the basis of the shape of the light guiding plate 5 as shown in FIG. 3 so that the values satisfy the following equation (2):

$$L = (a-b)/\tan\gamma - L_R \qquad (2),$$

Wherein a: the thickness of the light guiding plate 5 at the first end surface side 5a, b: the thickness of the light guiding plate 5 at the second end surface side 5b, and $L_R$: the length of the light exiting portion R along the X direction.

The thickness "a" can be set according to the light sources 4 while the thickness "b" can be set so that the second end surface 5b can reflect the light beams in the X direction as little as possible. The thickness "b" may be set to 1 mm or less, for example. The length $L_R$ of the light exiting portion R can be set according to the required luminous intensity and the like.

It should be noted that the light beams exiting from the prism sheet 6 are not limited to those along the optical path A in the Y direction, but can include those within a predetermined range with the optical path A as a center for use in illumination of a liquid crystal display device. For example the range can be defined as a range of ±10° with respect to the optical path A (or for example, between the optical paths B and C in FIG. 5). In view of this, in order to increase the effective luminance, it should be considered which light beams being incident on the light guiding plate 5 from the light sources 4 in the X direction can travel and exit from the prism sheet 6 within the range between the optical paths B and C. In order to determine the range, the respective light exiting angles β can be computed for the optical paths B and C as in the case of the optical path A, and then incident angles δ on the light guiding plate 5 can be computed corresponding to the respective exiting angles β for the optical paths B and C, as shown in FIGS. 5B and 5C. The incident angles δ may fall within a range where the light beams can be condensed in the Y direction by the condenser lens 7, and the incident angles δ can fall within a range of ±10° with respect to the X direction.

Accordingly, the present exemplary embodiment can be configured such that the entrance length L can be provided while considering a range of the light beams exiting from the prism sheet 6. In this manner, as shown in FIGS. 6A and 6B, the light beams exiting from the prism sheet 6 can be condensed appropriately in the Y direction. Herein, FIG. 6A includes a luminance distribution diagram of the light exiting portion R of the light guiding plate 5 from the Y direction and a luminance distribution diagram (cross section) of the same on the X-Y plane. FIG. 6B includes a luminance distribution diagram of the light exiting surface of the prism sheet 6 from the Y direction and luminance distribution diagrams of the same in the X-Y plane and Y-Z plane, respectively. As shown, the light beams exiting from the light exiting portion R at a light exiting angle β distributed around 60° (FIG. 6A) can be condensed appropriately along the Y direction on the light exiting surface of the prism sheet 6 (FIG. 6B).

Figure 8:
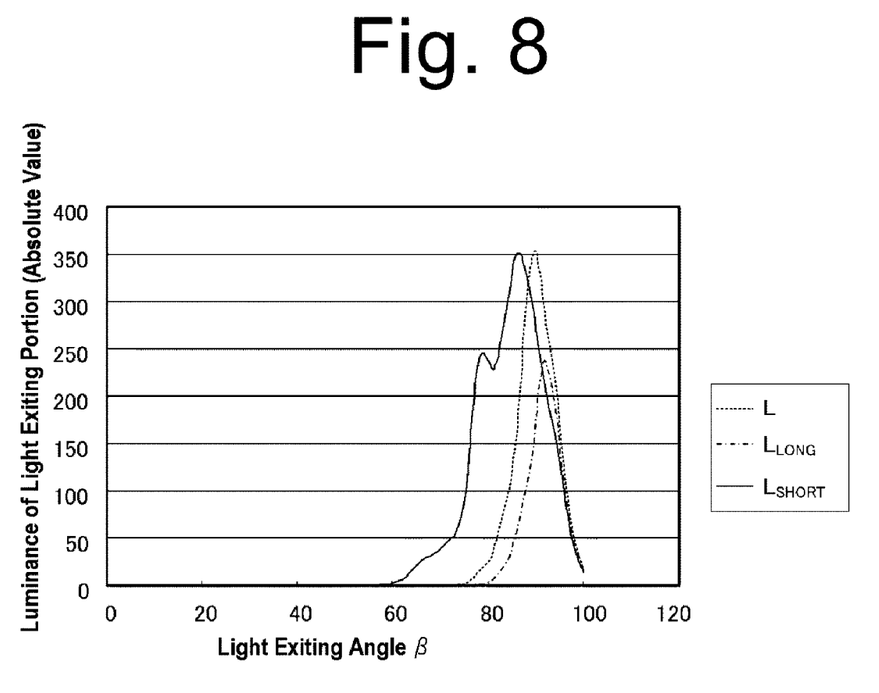
FIG. 8 is a graph illustrating the relationship between a light exiting angle and luminance when an entrance length is varied.

Furthermore, FIG. 8 is a graph illustrating the relationship between a light exiting angle and luminance when an entrance length is varied. As shown, when a longer entrance length $L_{LONG}$ that is longer than the best entrance length L computed by the above computation method is provided, the luminance of the light beams exiting from the prism sheet 6 may deteriorate (dashed line). On the other hand, when a shorter entrance length $L_{SHORT}$ that is shorter than the best entrance length L is provided, the peak value of the light exiting angle β may be shifted from the best value while widened entirely, thereby increasing the amount of light beams that cannot be effectively condensed by the prism sheet 6.

In the above surface light source device 1, the light exiting portion R that is formed over the light exiting surface 5c can be disposed a predetermined entrance length L away from the first end surface 5a along the X direction so that the light exiting surface 5c can form a predetermined angle with the tapered surface 5a as a taper angle γ. By providing such an entrance length L, even if a thicker high-power light source 4 is utilized, the taper angle γ can be set to a predetermined angle, and accordingly, the light exiting angle β from the light exiting surface 5c can be allowed to fall within the predetermined range so that the light beams can be condensed by the prism sheet 6 in the Y direction. This can improve the front luminance when compared with the case of a conventional device.

Furthermore, the condenser lens 7 can be provided between the light sources 4 and the first end surface 5a of the light guiding plate 5 so as to condense the light beams from the light sources 4 within a range in the Y direction. Accordingly, even if a top-view type LED is utilized for the light source 4, the light beams diffused in the Y direction can be condensed in the Y direction in order to be incident on the light guiding plate 5 properly. Therefore, the light beams propagating through the light guiding plate 5 can be prevented from rising at an acute angle in the Y direction, and accordingly, the light exiting angle β from the light exiting portion R can be allowed to fall within the predetermined range. This can improve the front luminance.

It will be apparent to those skilled in the art that various modifications and variations can be made in the presently disclosed subject matter without departing from the spirit or scope of the presently disclosed subject matter. Thus, it is intended that the presently disclosed subject matter cover the modifications and variations of the presently disclosed subject matter provided they come within the scope of the appended claims and their equivalents. All related art references described above are hereby incorporated in their entirety by reference.

What is claimed is:

1. A surface light source device comprising:
    a light guiding plate having a first end surface and a second end surface being narrower than the first end surface, a light exiting surface including a light exiting portion, and a tapered surface disposed opposite to the light exiting surface and tapered with respect to the light exiting surface from the first end surface to the second end surface of the light guiding plate;
    a light source disposed along the first end surface of the light guiding plate;
    a reflection sheet disposed along the tapered surface of the light guiding plate; and
    a prism sheet having a prism surface facing toward the light exiting portion of the light guiding plate,
    wherein the light exiting portion is disposed a predetermined entrance length L away from the first end surface along a direction perpendicular to the first end surface so that the light exiting surface within a plane perpendicular to the first end surface forms a predetermined angle with the tapered surface as a taper angle γ,
    wherein the taper angle γ satisfies the following equations (1) and (2), and the entrance length L satisfies the following equation (2):

$$\sin(90 - 2m\gamma) = n_A/n_G \times \sin\beta \quad (1)$$

$$L = (a-b)/\tan\gamma - L_R \quad (2),$$

wherein
    m: the number of reflections of the light beams, incident on and substantially perpendicular to the first end surface, reflected by the tapered surface,
    $n_A$: refraction index of air,
    $n_G$: refraction index of the light guiding plate,
    β: the light exiting angle by which the light beams exit from the light exiting portion to the prism sheet (unit: degrees),
    a: the thickness of the light guiding plate at the first end surface,
    b: the thickness of the light guiding plate at the second end surface, and
    $L_R$: the length of the light exiting portion along the direction perpendicular to the first end surface.

2. The surface light source device according to claim 1, further comprising a second reflection sheet extending the entire entrance length L along the light exiting surface from the first end surface to the light exiting portion.

3. The surface light source device according to claim 2, wherein the entrance length L is a substantial portion of a length of the light guiding plate, the length of the light guiding plate being bounded by the first end surface and the second end surface of the light guiding plate.

4. The surface light source device according to claim 1, further comprising a condenser lens disposed between the light source and the first end surface of the light guiding plate, the condenser lens configured to condense light beams emitted from the light source within a range equivalent to a thickness of the light guiding plate in a vertical direction.

5. The surface light source device according to claim 4, wherein the condenser lens is a cylindrical lens.

6. The surface light source device according to claim 1, wherein the light source is an LED light source.

7. The surface light source device according to claim 1, further comprising a second reflection sheet located along the light exiting surface of the light guiding plate and defining the light exiting portion.

8. A surface light source device comprising:
    a light guiding plate having a first end surface and a second end surface being narrower than the first end surface, a light exiting surface including a light exiting portion, and a tapered surface disposed opposite to the light exiting surface and tapered with respect to the light exiting surface from the first end surface to the second end surface of the light guiding plate;
    a light source disposed along the first end surface of the light guiding plate;
    a reflection sheet disposed along the tapered surface of the light guiding plate; and
    a prism sheet having a prism surface facing toward the light exiting portion of the light guiding plate, and
    a condenser lens disposed between the light source and the first end surface of the light guiding plate, the condenser lens configured to condense light beams emitted from the light source within a range equivalent to a thickness of the light guiding plate in a vertical direction, wherein the light exiting portion is disposed a predetermined entrance length L away from the first end surface along a direction perpendicular to the first end surface so that the light exiting surface within a plane perpendicular to the first end surface forms a predetermined angle with the tapered surface as a taper angle $\gamma$.

9. The surface light source device according to claim 8, wherein the condenser lens is a cylindrical lens.

10. A surface light source device comprising:
a light guiding plate having a first end surface and a second end surface being narrower than the first end surface, a substantially planar light exiting surface including a discrete light exiting portion co-planar with the substantially planar light exiting surface and occupying less than half of an area defined by the entire substantially planar light exiting surface, and a tapered surface disposed opposite to the light exiting surface and tapered with respect to the light exiting surface from the first end surface to the second end surface of the light guiding plate;
a plurality of structures surrounding the light guiding plate such that light is prevented from exiting the light guiding plate except via the light exiting portion, the structures including,
a light source disposed along the first end surface of the light guiding plate,
a reflection sheet disposed along the tapered surface of the light guiding plate, and
a second reflection sheet disposed along the light exiting surface; and
a prism sheet having a prism surface facing toward the light exiting portion of the light guiding plate, wherein
the light exiting portion is disposed a predetermined entrance length L away from the first end surface along a direction perpendicular to the first end surface so that the light exiting surface within a plane perpendicular to the first end surface forms a predetermined angle with the tapered surface as a taper angle $\gamma$.

11. The surface light source device according to claim 10, wherein the second reflection sheet extends the entire entrance length L along the light exiting surface from the first end surface to the light exiting portion.

12. The surface light source device according to claim 10, wherein the taper angle $\gamma$ satisfies the following equations (1) and (2), and the entrance length L satisfies the following equation (2):

$$\sin(90-2m\gamma)=n_A/n_G\times\sin\beta \quad (1)$$

$$L=(a-b)/\tan\gamma-L_R \quad (2),$$

wherein
m: the number of reflections of the light beams, incident on and substantially perpendicular to the first end surface, reflected by the tapered surface,
$n_A$: refraction index of air,
$n_G$: refraction index of the light guiding plate,
$\beta$: the light exiting angle by which the light beams exit from the light exiting portion to the prism sheet (unit: degrees),
a: the thickness of the light guiding plate at the first end surface,
b: the thickness of the light guiding plate at the second end surface, and
$L_R$: the length of the light exiting portion along the direction perpendicular to the first end surface.

13. The surface light source device according to claim 12, further comprising a condenser lens disposed between the light source and the first end surface of the light guiding plate, the condenser lens configured to condense light beams emitted from the light source within a range equivalent to a thickness of the light guiding plate in a vertical direction.

14. The surface light source device according to claim 10, further comprising a condenser lens disposed between the light source and the first end surface of the light guiding plate, the condenser lens configured to condense light beams emitted from the light source within a range equivalent to a thickness of the light guiding plate in a vertical direction.

15. The surface light source device according to claim 14, wherein the condenser lens is a cylindrical lens.

16. The surface light source device according to claim 10, wherein the second reflection sheet defines the light exiting portion.

* * * * *